United States Patent
Bolton

[15] 3,698,798
[45] Oct. 17, 1972

[54] REAR VIEW MIRROR FOR AUTO BUMPERS

[72] Inventor: Lawrence Bolton, Route 2, Box 63, Cody, Wyo. 82414

[22] Filed: Feb. 11, 1971

[21] Appl. No.: 114,565

[52] U.S. Cl..............350/307, 248/226 B, 248/466, 248/474, 248/487, 350/302
[51] Int. Cl..............................................B60r 1/08
[58] Field of Search ......350/307, 288, 302; 248/474, 248/469, 466, 226 B, 228, 479, 485, 487

[56] References Cited

UNITED STATES PATENTS

| | | | |
|---|---|---|---|
| 2,075,900 | 4/1937 | Jackson | 350/302 |
| 3,166,283 | 1/1965 | Farnsworth | 350/307 X |
| 2,133,839 | 10/1938 | Addor | 350/307 X |
| 2,529,686 | 11/1950 | Green | 248/226 B |

Primary Examiner—David Schonberg
Assistant Examiner—John W. Leonard

[57] ABSTRACT

A rear bumper mounted mirror to aid in backing a vehicle from a curb into traffic, the device comprising a mirror attached to the upper end of a rod, the lower end of the rod having a clamp unit for attachment to a rear bumper of an automotive vehicle. The mirror at the upper end of the rod is pivotably adjustable and securable in a preferred adjusted position so that a motorist can either turn his head and look into the mirror or adjust a rear vision mirror of the vehicle and without turning his head thus see the rear bumper mounted mirror.

1 Claim, 4 Drawing Figures

PATENTED OCT 17 1972 3,698,798
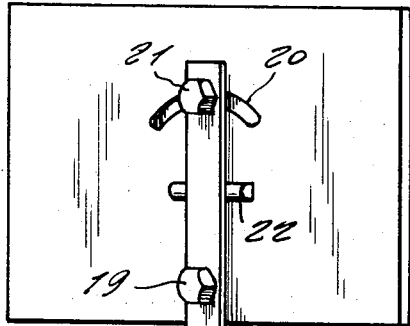
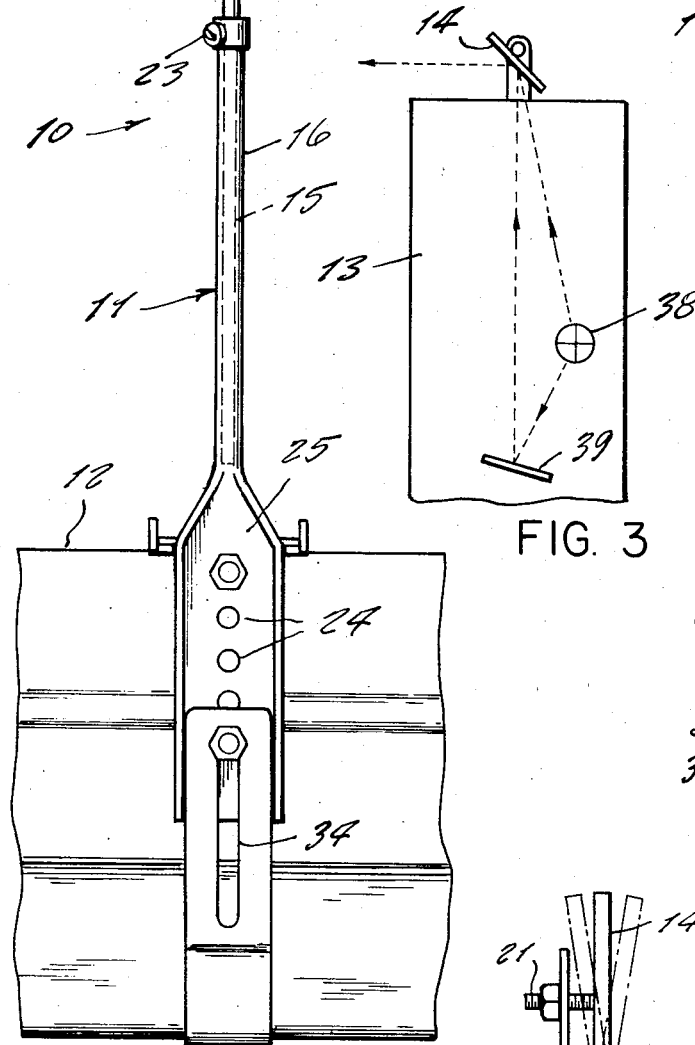
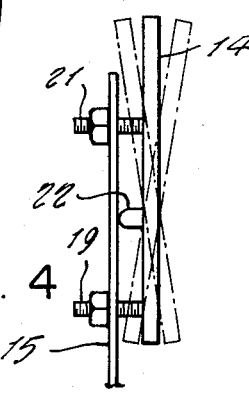
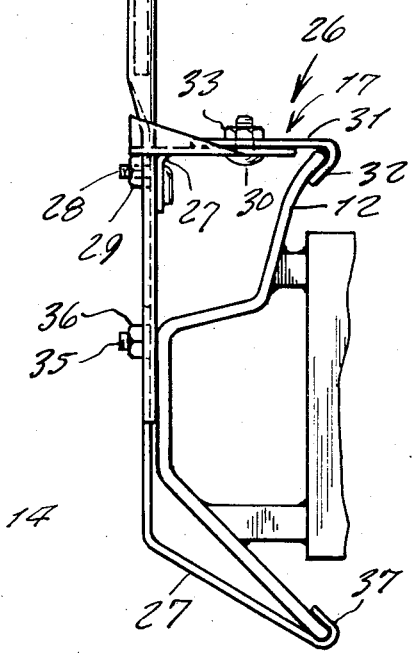
FIG. 1
FIG. 2
FIG. 3
FIG. 4
INVENTOR.
LAWRENCE A. BOLTON

REAR VIEW MIRROR FOR AUTO BUMPERS

This invention relates generally to automotive vehicles.

More specifically the present invention relates to viewing mirrors for an automotive vehicle.

A principal object of the present invention is to provide a rear bumper mounted mirror for assisting a driver to back out his vehicle from a curb into traffic, particularly when being blinded by campers on pickups, trucks and the like.

Another object of the present invention is to provide a rear bumper mounted mirror which can be adjusted so that the vehicle operator can see what traffic is coming and back out when all is clear.

Still another purpose of the present invention is to provide a rear bumper mounted mirror which can be adjusted so that the vehicle driver can either turn his head and look into the mirror directly or adjust the rear vision mirror of the vehicle and see the rear bumper mounted mirror without turning his head.

Still another object of the present invention is to provide a rear bumper mounted mirror which will save a great deal of confusion and accidents.

Still another object of the present invention is to provide a rear bumper mounted mirror which when mounted on the vehicle will stay affixed, the device requiring no holes to drill for mounting, and which will not interfere with the raising of the trunk lid.

Still another object of the present invention is to provide a rear bumper mounted mirror which takes less than five minutes to mount and to adjust.

Still another object of the present invention is to provide a rear bumper mounted mirror which will fit any make and model of automotive vehicles.

Other objects of the present invention are to provide a rear bumper mounted mirror which is simple in design, inexpensive to manufacture, rugged in construction, easy to use and efficient in operation.

These and other objects will be readily evident upon a study of the following specification and the accompanying drawing wherein:

FIG. 1 is a rear elevation view of the present invention shown mounted on a rear bumper of an automotive vehicle, FIG. 2 is a side elevation view thereof, FIG. 3 is a schematic plan view of an automotive vehicle and showing the present invention in operative use, and FIG. 4 is a side edge view showing how the mirror is pivotable about a pivot or fulcrum block between an upper and lower bolt.

Referring now to the drawing in detail, the reference numeral 10 represents a rear view mirror for automobile bumpers according to the present invention wherein there is an assembly 11 that can be readily secured to a rear bumper 12 of an automotive vehicle 13.

The assembly 11 includes a mirror 14 supported on the upper end of a vertically extending rod 15, the lower end of the rod 15 being telescopically fitted into a tubular post 16 which at its lower end is attached to a clamp unit 17.

The mirror 14 is fitted into a frame 18 which on its rear side has an opening for threadingly engaging a bolt 19.

A slot 20 formed on the rear side of the frame 18 permits pivoting of the mirror so that a bolt 21 extending through the slot 20 engages a nut, not seen, on the other side of the slot 20 and thereby rigidly secures the mirror in a selected angled position.

A rib 22 serves to space the upper end of the rod 15 from a rear side of the frame 18.

The lower end of the rod 15 is receivable into the upper end of a tubular post 14, and is selectively adjusted and secured by means of a set screw 23.

The lower end of the post 16 is provided with a vertically extending row of openings 24 formed on a flat portion 25 of the post so to selectively attach an upper unit member 26 and a lower clamp member 27 of the clamp unit 17.

The upper clamp member 26 includes an angle bracket 28 which is attachable by a bolt 28 receivable through one of the openings 24 and secured by a nut 29.

The angle bracket 27 has a horizontal extension into which there is received a bolt 30 fitted through a plate 31 which at one end has a hook 32 for being fitted around an upper end of a rear bumper 12, and the bolt 30 being securable by means of a nut 33.

Thus the upper clamp member is thoroughly adjustable. The lower member 27 is likewise adjustable for the bumper and includes a longitudinally extending vertical slot 34 through which a bolt 35 is fitted and into one of the openings 24 of the post, the bolt 35 then being secured by a nut 36.

The lower end of the lower clamp member 27 is provided with a hook 37 that is receivable around a lower edge of the bumper 12.

As shown in FIG. 3 of the drawing, the rear bumper mounted mirror 10 can be used by a driver 38 turning his head and looking directly into the mirror 14, or said driver 38 may look into the conventional rear view mirror 39 of the vehicle 13 and from the rear view mirror 39 look to the rear bumper mounted mirror 14 without thus turning his head.

Thus either method can be used in accomplishing the task.

What I now claim is:

1. In a rear, bumper-mounted mirror assembly, a mirror mounted in a frame secured to a bumper-supported vertical post by two bolts passing through said post and into the rear of said frame, one of said bolts being threaded directly into said frame, the other of said bolts being threaded into a free-moving plate inside said frame but accessible through an arcuate slot, the center of radius of said slot being at the first of said bolts to permit rotation for adjustment of said mirror about the axis of the first of said bolts, said frame being provided with a projecting ridge intermediate of said bolts, said ridge being a pivot to permit rocking adjustment of said mirror about a horizontal axis perpendicular to said bolt axis, said vertical post being rotatable about its longitudinal axis for adjustment of said mirror about a vertical axis, telescoping means mounting said vertical post for adjustment of said mirror along said vertical axis, and adjustable bumper gripping means supporting said telescoping means and being positionable along a bumper for horizontal adjustment of said mirror.

* * * * *